United States Patent
Kerbrat et al.

(10) Patent No.: US 12,503,664 B2
(45) Date of Patent: Dec. 23, 2025

(54) ESTER BASED FUNCTIONAL FLUID

(71) Applicant: OLEON NV, Evergem (BE)

(72) Inventors: Marion Kerbrat, Margny-lès-Compiègne (FR); Anne-Elise Lescoffit, Margny-lès-Compiègne (FR); Pieter Struelens, Gooik (BE)

(73) Assignee: Oleon NV, Evergem (BE)

( * ) Notice: Subject to any disclaimer, the term of this patent is extended or adjusted under 35 U.S.C. 154(b) by 0 days.

(21) Appl. No.: 18/838,166

(22) PCT Filed: Dec. 14, 2023

(86) PCT No.: PCT/EP2023/085918
§ 371 (c)(1),
(2) Date: Aug. 13, 2024

(87) PCT Pub. No.: WO2024/126732
PCT Pub. Date: Jun. 20, 2024

(65) Prior Publication Data
US 2025/0115820 A1 Apr. 10, 2025

(30) Foreign Application Priority Data

Dec. 16, 2022 (EP) .................................... 22306924

(51) Int. Cl.
| | | |
|---|---|---|
| C10M 105/34 | (2006.01) | |
| C10M 159/00 | (2006.01) | |
| C10M 169/04 | (2006.01) | |
| C10N 30/10 | (2006.01) | |

(52) U.S. Cl.
CPC ...... C10M 105/34 (2013.01); C10M 159/005 (2013.01); C10M 169/04 (2013.01); *C10M 2207/2815* (2013.01); *C10N 2030/10* (2013.01)

(58) Field of Classification Search
CPC ............ C10M 105/34; C10M 159/005; C10M 169/04; C10M 2207/2815; C10N 2030/10
See application file for complete search history.

(56) References Cited

U.S. PATENT DOCUMENTS

| | | |
|---|---|---|
| 2016/0319215 A1 | 11/2016 | Hirooka et al. |
| 2020/0277542 A1 | 9/2020 | Salvi et al. |
| 2021/0230096 A1* | 7/2021 | Urata ................... C10M 105/34 |
| 2021/0380899 A1* | 12/2021 | Van Wassen ....... H01M 10/613 |
| 2022/0131205 A1* | 4/2022 | Champagne .......... H01M 10/36 |
| 2022/0333029 A1* | 10/2022 | Scherer ................ C10M 105/36 |
| 2024/0209275 A1* | 6/2024 | Moody ................ C10M 105/34 |
| 2024/0425772 A1* | 12/2024 | Matsubara ............ C07C 53/126 |

OTHER PUBLICATIONS

International Search Report and Written Opinion for International Application No. PCT/EP2023/085918, Apr. 26, 2024, ISA/EP.

* cited by examiner

*Primary Examiner* — Ellen M McAvoy

(74) *Attorney, Agent, or Firm* — ArentFox Schiff LLP

(57) ABSTRACT

The present invention relates to the use of specific esters in a functional fluid for electric vehicles.

9 Claims, 1 Drawing Sheet

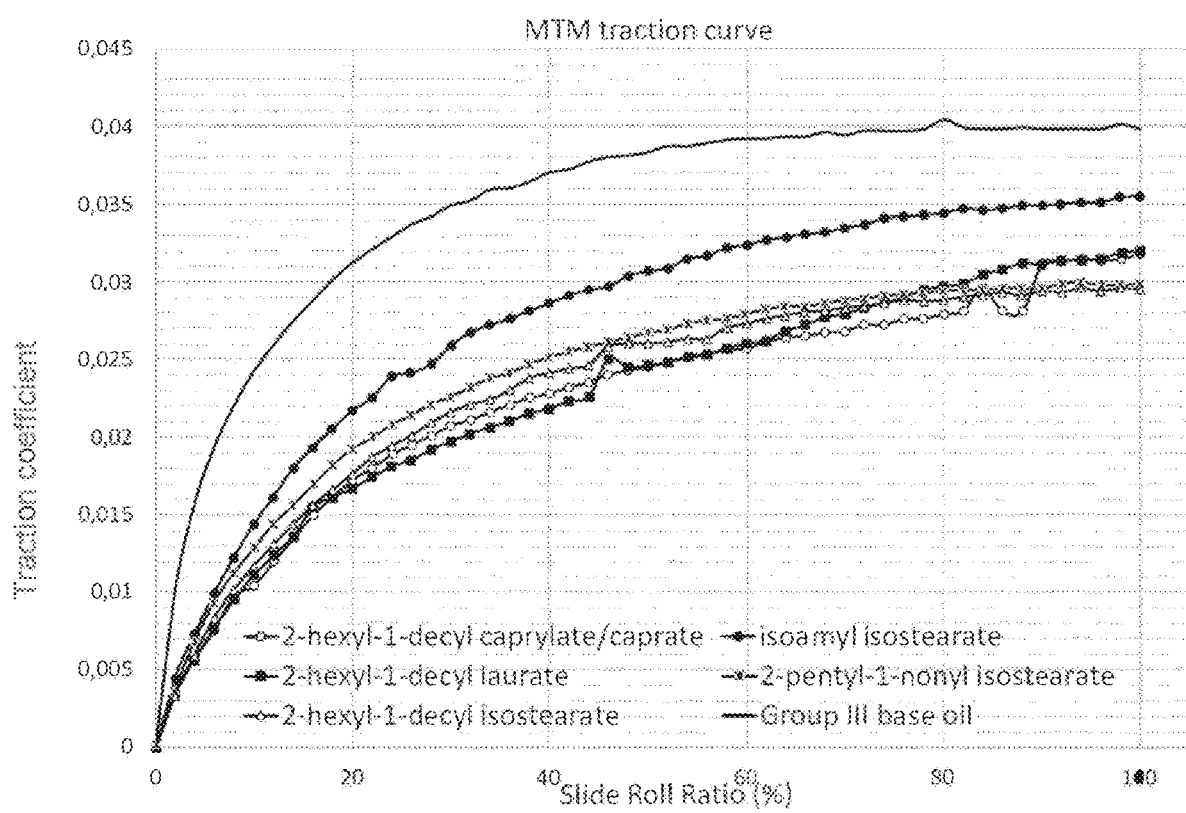

ESTER BASED FUNCTIONAL FLUID

CROSS-REFERENCE TO RELATED APPLICATIONS

The present application is a national stage application filed under 35 U.S.C. 371 based on International Patent Application No. PCT/EP2023/085918, filed Dec. 14, 2023, which claims priority to EP patent application Ser. No. 22/306,924.6, filed Dec. 16, 2022, the disclosures of each of which are hereby incorporated by reference in their entireties.

The present invention relates to the use of specific esters in a functional fluid for electric vehicles.

A functional fluid lubricate and cool electric devices. More particularly, a functional fluid has good compatibilities with materials constituting the electric devices, such as the electric motor and/or the battery present in an electric vehicle.

Thus, preferably, a functional fluid is able to lubricate and cool, with good compatibilities with elastomers.

Such a functional fluid is particularly interesting for use in electric vehicles.

Indeed, in electric vehicles, the electric motor, the transmission and the power electronics tend to be integrated to save volume and weight.

Moreover, in electric vehicles, the internal combustion engines is replaced by a battery pack to delivers power.

A battery pack is a set batteries, generating a lot of heat that needs to be cooled down. Indirect cooling, as in combustion vehicles, is not sufficient to ensure homogeneous cooling.

Also, electrical devices in an electric vehicle, in particular the battery pack, may be cooled by direct contact, such as by immersion cooling.

That is why, it is particularly important that the functional fluid be compatible with the different materials used in the various components of an electric vehicle, with which the functional fluid may come into contact.

Thanks to its multiple properties, the same functional fluid can be used to lubricate the gears, and to cool the electric motor, the transmission and the power electronics of the electric vehicle, without damaging the elastomer seals.

Preferably, the same functional fluid can be used to lubricate and cool the electric devices present in an electric vehicle, without damaging the plastic components part of the electric devices.

More preferably, the same functional fluid can be used to lubricate and cool the electric devices present in an electric vehicle, without damaging the elastomer seals and the plastic components part of the electric devices.

As interest in electric vehicles grows, there is an increasing need for such functional fluids that combine multiple properties, such as effective lubrication, good thermal (heat transfer) properties, good electrical (not conductive) properties, seal compatibility property, and low viscosities. Preferably, the functional fluid presents also a good plastic compatibility property.

More particularly, there is a need for a functional fluid that will gather characteristics required for electrical vehicles, such as the following characteristics:

- a good lubricity property, indicated by a friction reduction ability measured using a ball-plane device where the friction force is measured as a function of different contact parameters, such as a Mini Traction Machine (MTM) device, wherein the traction curve is below the curve obtained in same conditions with a mineral oil of Group III;
- a low kinematic viscosity, such as lower than 30 mm²/s at 40° C. and lower than 5 mm²/s at 100° C., measured according to the standard ASTM D445;
- a pour point of at most −40° C., measured according to the standard ASTM D97;
- a flash point greater than 200° C., measured according to the standard ASTM D92;
- an oxidation stability of at least 700 min in presence of an antioxidant additive (less than 2 wt %, preferably less than 1.5 wt %, based on the weight of the functional fluid), measured according to the standard ASTM D2272;
- a thermal conductivity of at least 0.1300 W/(m. ° C.) at 20° C., measured according to the standard ASTM 7896;
- a dielectric breakdown at 20° C. greater than 30 kV, measured according to the standard ASTM D877;
- a good compatibility with elastomer(s), in particular a good compatibility with elastomer(s) selected from acrylonitrile-butadiene rubber, such as NBR 1, hydrogenated nitrile butadiene rubber, such as HNBR 1 and/or fluorinated rubber, such as FKM 2.

Preferably, the functional fluid has the additional characteristic:

- a good compatibility with plastic(s), in particular a good compatibility with plastic(s) selected from polyamide-6 (PA6), epoxy, polyimide, polyoxymethylene, polyethylene terephthalate and/or polyurethane resin.

NBR 1 is an elastomer based on acrylonitrile butadiene rubber with an acrylic nitrile content of 28% by weight based on the total weight of rubber.

FKM 2 is an elastomer based on fluorinated rubber. It is more particularly constituted by vinylidene fluoride, hexafluoropropylene and tetrafluoroethylene and has a fluorine content comprised between 68 and 69% by weight based on the total weight of rubber.

HNBR 1 is an elastomer based on hydrogenated acrylonitrile-butadiene rubber with an acrylonitrile content of 35% based on the total weight of rubber.

The compatibility of a fluid with elastomers is in particular the ability of the fluid not to cause swelling nor shrinking of the elastomer when the latter is in contact with the fluid.

By "good compatibility with elastomer(s)", it is intended to mean that an elastomer NBR 1 presents no more than 15% change in volume and/or that an elastomer FKM 2 presents no more than 2.5% change in volume after 168 hours at 100° C.; the change in volume being measured according to the standard ISO 6072. Preferably, in addition, an elastomer AEM and/or ACM present(s) no more than 5%, more preferably no more than 2% change in volume after 240 hours at 80° C.

This compatibility is important because elastomers are frequently present in electrical vehicles. For example, the materials used in seals for engines and transmissions are made of elastomers.

The compatibility of a fluid with a plastic is in particular the ability of the fluid not to cause swelling nor shrinking of the plastic when the latter is in contact with the fluid.

By "good compatibility with plastic(s)", it is intended to mean that a plastic selected from selected from polyamide-6 (PA6), epoxy, polyimide, polyoxymethylene, polyethylene terephthalate and/or polyurethane resin, presents no more than 15%, preferably no more than 10% change in mass after 240 hours at 80° C.

Indeed, a battery pack is mainly made of plastics such as polyamide and polyurethane, which have proven to be highly resistant to heat and are lighter than metals.

The Applicant surprisingly found that specific esters could combine all those characteristics.

Moreover, the said esters may be obtained from renewable chemicals.

Accordingly, the present invention relates to the use of an ester selected from the group consisting of:
- esters obtainable from esterification of a saturated branched monoalcohol comprising from 5 to 16 carbon atoms, with isostearic acid;
- esters obtainable from esterification of 2-hexyl-1-decanol with a saturated fatty acid comprising from 7 to 18 carbon atoms; and
- mixtures thereof;

in a functional fluid for an electric vehicle.

In particular, the functional fluid is used to lubricate and to cool device(s) present in an electric vehicle, while presenting very good compatibility with elastomer(s). The device(s) in the electric vehicle comprise elastomeric seals.

More particularly, the ester used according to the invention exhibits multiple properties such as lubricity, cooling, electric, and compatibility with elastomer(s), and suitable physico-chemical properties to be used in an electric vehicle. The suitable physico-chemical properties required for electric vehicles are in particular:
- a kinematic viscosity lower than 30 mm$^2$/s at 40° C. and lower than 5 mm$^2$/s at 100° C., measured according to the standard ASTM D445;
- a pour point of at most −40° C., measured according to the standard ASTM D97;
- a flash point greater than 200° C., measured according to the standard ASTM D92;
- an oxidation stability of at least 700 min in presence of an antioxidant additive (less than 1.5 wt % based on the weight of the ester), measured according to the standard ASTM D2272.

In the present application, unless otherwise indicated, all ranges of values used are to be understood as being inclusive limits.

Preferably, the ester used according to the invention, is used without the presence of an additional diester.

A branched monoalcohol is a branched hydrocarbon chain comprising only one hydroxyl function.

Advantageously, in the use according to the invention, the ester is compatible with elastomer(s), elastomer NBR 1 presenting no more than 15% change in volume and/or elastomer FKM 2 presenting no more than 2.5% change in volume, when immersed in said ester during 168 hours at 100° C.; the change in volume being measured according to the standard ISO 6072.

Advantageously, in the use according to the invention, the saturated branched monoalcohol is selected from the group consisting of isoamyl alcohol, 2-ethylbutyl, 2-butylhexanol, 2-butyl-1-heptanol, 2-butyl-1-octanol, 2-pentyl-1-nonanol, 2-hexyl-1-octanol and 2-hexyl-1-decanol.

Preferably, the saturated branched monoalcohol comprise 5, 12, 14 or 16 carbon atoms.

More preferably, the saturated branched monoalcohol comprise 5, 14 or 16 carbon atoms.

In particular, the monoalcohol is selected from the group consisting of isoamyl alcohol, 2-pentyl-1-nonanol and 2-hexyl-1-decanol.

Even more preferably, the saturated branched monoalcohol comprises 14 or 16 carbon atoms.

In particular, the monoalcohol is selected from the group consisting of 2-pentyl-1-nonanol and 2-hexyl-1-decanol.

Advantageously, in the use according to the invention, the saturated fatty acid is selected from the group consisting of heptanoic acid, caprylic acid, capric acid, lauric acid, myristic acid, palmitic acid, isostearic acid, and mixtures thereof.

Preferably, the fatty acid is selected from the group consisting of heptanoic acid, caprylic acid, capric acid, lauric acid, isostearic acid, and mixtures thereof.

Advantageously, in the use according to the invention, the ester is selected from the group consisting of:
- isoamyl isostearate;
- 2-pentyl-1-nonyl isostearate;
- 2-hexyl-1-decyl isostearate;
- 2-hexyl-1-decyl laurate;
- 2-hexyl-1-decyl caprylate/caprate; and
- 2-hexyl-1-decyl heptanoate.

In particular, in the use according to the invention, the ester is selected from the group consisting of:
- 2-pentyl-1-nonyl isostearate;
- 2-hexyl-1-decyl isostearate;
- 2-hexyl-1-decyl laurate; and
- 2-hexyl-1-decyl caprylate/caprate.

Those esters exhibit better lubricity properties, as illustrated in FIG. 1.

More particularly, in the use according to the invention, the ester is 2-hexyl-1-decyl isostearate.

The present invention also relates to a functional fluid for an electric vehicle, comprising:
- an ester selected from the group consisting of:
  - isoamyl isostearate;
  - 2-pentyl-1-nonyl isostearate;
  - 2-hexyl-1-decyl isostearate;
  - 2-hexyl-1-decyl laurate;
  - 2-hexyl-1-decyl caprylate/caprate;
  - 2-hexyl-1-decyl heptanoate; and
- an antioxidant additive;

wherein the functional fluid does not contain any diester.

A functional fluid typically comprises a base oil, usually the major constituent (the constituent whose content is the highest), eventually a co-base oil (a second base oil in an amount lower than the first base oil), and one or more additive(s).

The American Petroleum Institute (API) has categorized base oils into five groups:

The first three groups are mineral oils refined from petroleum crude oil:
- Group I base oils have a saturated hydrocarbon content of less than 90% by weight, an aromatic hydrocarbon content of more than 1.7% by weight, a sulphur content of more than 0.03% by weight, and a viscosity index between 80 and 120;
- Group II base oils have a saturated hydrocarbon content of more than 90% by weight, an aromatic hydrocarbon content of less than 1.7% by weight, a sulphur content of less than 0.03% by weight, and a viscosity index between 80 and 120;
- Group III base oils have a saturated hydrocarbon content of more than 90% by weight, an aromatic hydrocarbon content of less than 1.7% by weight, a sulphur content of less than 0.03% by weight, and a viscosity index greater than 120;

the percentages by weight being based on the weight of the base oil.

Group IV base oils are synthetic oils, such as polyalphaolefins.

Group V is for all other base oils not included in any of Groups I to IV.

In the functional fluid according to the invention, the base oil and the co-base-oil may be independently a base oil from any Group from Group I to Group V.

The esters used according to the invention are classified in Group V.

In the functional fluid, the ester used according to the invention, may be used as a base oil or a co-base oil.

Thus, the base oil and the co-base oil if present, need to cumulate the lubricating, thermal, electrical and elastomers compatibility properties.

An additive is used to enhance one or more intrinsic property(ies) of the base oil(s) and/or provide it with one or more additional property(ies).

In the functional fluid, the ester used according to the invention, may also be used as an additive.

The quantity of the ester used according to the invention is preferably of at least 5% by weight, more preferably of at least 7% by weight based on the weight of the functional fluid.

The quantity of the ester used according to the invention is preferably of at most 95% by weight, more preferably of at most 90% by weight based on the weight of the functional fluid.

An antioxidant additive may improve the oxidative stability of the base oil, if the base oil and the antioxidant additive are compatible, meaning, there is no competition between them.

As illustrated in Example 1.3, the presence of antioxidant additives allows to improve the oxidative stability of the esters to at least 700 min at the RPVOT test according to ASTM D2272.

Preferably, the quantity of the antioxidant represents at least 0.05% by weight, more preferably at least 0.1% by weight based on the weight of the functional fluid.

Preferably, the quantity of the antioxidant represents at most 1.5% by weight, more preferably at most 1% by weight based on the weight of the functional fluid.

Preferably, the antioxidant additive is selected from the group consisting of phenols, amines, thiadiazoles, dialkyl dithiophosphates, and amine phosphates.

The functional fluid may further comprise one or more additive(s) used in the field of lubricants, other than an antioxidant additive.

The additive(s) used in the field of lubricants, may be easily selected by a person skilled in the art who knows how to select the most suitable additive(s) and quantity depending on the application. By way of example, reference may be made to the following manuals: "Fuels and Lubricants Handbook: technology, properties performance and testing", by George E. Totten, 2003 and "Handbook of lubrification and tribology, vol II: Theory and Design", by Robert W. Bruce, 2012.

The additive(s) used in the field of lubricants is/are preferably selected from the group consisting of metal deactivators; corrosion inhibitors; extreme pressure additives; anti-foams; demulsifiers; solubility improvers; and mixtures thereof.

The total quantity of additive(s) is preferably of at least 5%, more preferably of at least 7% by weight based on the total weight of functional fluid.

The total quantity of additive(s) is preferably of at most 30%, more preferably of at most 25%, even more preferably of at most 20% by weight based on the total weight of functional fluid.

By "total quantity of additive(s)" it is intended to mean the quantity of all additive(s), including the antioxidant and the additive(s) used in the field of lubricants other than an antioxidant, present in the functional fluid.

Preferably, in the functional fluid, the ester used according to the invention is selected from the group consisting of 2-pentyl-1-nonyl isostearate; 2-hexyl-1-decyl isostearate; 2-hexyl-1-decyl laurate; and 2-hexyl-1-decyl caprylate/caprate.

The present invention also concerns a method for lubricating and cooling one or more device(s) in an electric vehicle, by bringing into contact the device(s) with an ester selected from the group consisting of:
  esters obtainable from esterification of a saturated branched monoalcohol comprising from 5 to 16 carbon atoms, with isostearic acid;
  esters obtainable from esterification of 2-hexyl-1-decanol with a fatty acid comprising from 7 to 18 carbon atoms; and
  mixtures thereof.

The esters, in particular the saturated branched monoalcohol and the fatty acid are as described above, including preferential and advantageous features.

The device(s) in the electric vehicle comprises elastomeric seals.

Preferably, the device(s) is the gear, the electric motor, the transmission, the battery and/or the power electronics.

Advantageously, in the method according to the invention, the ester is brought into contact via the functional fluid according to the invention.

In the method according to the invention, the ester is compatible with elastomer(s), elastomer NBR 1 presenting no more than 15% change in volume and/or elastomer FKM 2 presenting no more than 2.5% change in volume, when immersed in said ester during 168 hours at 100° C.; the change in volume being measured according to the standard ISO 6072.

The invention is further described in the following examples, given by way of illustration, with reference to the FIG. 1 representing a graph relating to the evolution of the traction coefficient of different esters and of a mineral oil of Group III, according to the slide roll ratio applied.

BRIEF DESCRIPTION OF THE SEVERAL VIEWS OF THE DRAWING

FIG. 1 shows a graph relating to the evolution of the traction coefficient of different esters and of a mineral oil, as discussed in Example 1.

EXAMPLE 1: CHARACTERISTICS OF ESTERS USED ACCORDING TO THE INVENTION 1.1. Chemicals Used
  isoamyl isostearate: was prepared by esterification of isoamyl alcohol (from Tradebe Chemicals) with isostearic acid (Radia 0905 from Oleon);
  2-pentyl-1-nonyl isostearate: was prepared by esterification of 2-pentyl-1-nonanol with isostearic acid (Radia 0905 from Oleon);
  2-pentyl-1-nonanol was prepared from n-heptanol as primary alcohol according to a Guerbet reaction. Such a reaction is described for example in patent U.S. Pat. No. 4,518,810 using KOH as a base and palladium as catalyst. The reaction medium was heated up to its boiling point. The crude reaction mixture was washed several times with demineralized water to remove all of the soaps. The washed product were subsequently filtered and dried under vacuum. The remaining starting primary alcohol was separated by distillation. Then, 2-pentyl-1-nonanol was isolated by distillation.

2-hexyl-1-decyl isostearate: was prepared by esterification of 2-hexyl-1-decanol (Isofol 16 from Sasol) with isostearic acid (Radia 0905 from Oleon);

2-hexyl-1-decyl laurate: was prepared by esterification of 2-hexyl-1-decanol (Isofol 16 from Sasol) with lauric acid (Radia 0653 from Oleon);

2-hexyl-1-decyl caprate/caprylate: was prepared by esterification of 2-hexyl-1-decanol (Isofol 16 from Sasol) with capric/caprylic acid (Radia 0640 from Oleon);

2-hexyl-1-decyl heptanoate: was prepared by esterification of 2-hexyl-1-decanol (Isofol 16 from Sasol) with heptanoic acid (Oleris n-heptanoic acid from Arkema).

1.2. Lubricity Property

The lubricity of a fluid is its ability to reduce friction (friction or deformation between moving parts) and/or to reduce wear on parts.

Therefore, the lubricity property of esters was evaluated and compared to a mineral oil of Group III widely used in industrial and automotive lubricants, Nexbase 3043 from Neste comprising isoparaffinic hydrocarbons, by measuring the friction reduction using a Mini Traction Machine (MTM) device under the following conditions:

Material: steel ball on steel disc
Load: 75N
Temperature: 80° C.
Rolling speed: 1000 mm/s
Slide Roll Ratio: from 0 to 100%.

The curves obtained are represented in FIG. 1.

It can be observed in FIG. 1, that the traction coefficient curve of each ester (isoamyl isostearate, 2-pentyl-1-nonyl isostearate, 2-hexyl-1-decyl isostearate, 2-hexyl-1-decyl laurate and 2-hexyl-1-decyl caprate/caprylate) is lower than the traction coefficient curve of the mineral oil of Group III.

The esters used according to the invention exhibit better lubricity property than the conventional mineral oil. In particular, 2-pentyl-1-nonyl isostearate, 2-hexyl-1-decyl isostearate, 2-hexyl-1-decyl laurate and 2-hexyl-1-decyl caprate/caprylate present the lowest traction coefficients, all lower than 0.033.

1.3. Physico-Chemical Properties

Kinematic viscosities, pour points and flash points were measured for each specific ester used according to the invention.

The oxidation stability of esters was determined using the Rotating Pressure Vessel Oxidation Test (RPVOT) according to the standard ASTM D2272, with 1.5% of add-pack (ADDITIN® RC 9321 from Lanxess) comprising mainly phenolic, aminic, thiadiazole and amine phosphate antioxidant additives.

Results are gathered in Table 1 below.

TABLE 1

Physico-chemical properties

| | Kinematic viscosity at 40° C. ($mm^2/s$) | Kinematic viscosity at 100° C. ($mm^2/s$) | Pour point (° C.) | Flash point (° C.) | RPVOT (min) |
|---|---|---|---|---|---|
| isoamyl isostearate | 8.6 | 2.6 | −52 | 208 | 833 |
| 2-pentyl-1-nonyl isostearate | 18.6 | 4.3 | −49 | 222 | |
| 2-hexyl-1-decyl isostearate | 21.1 | 4.8 | −51 | 262 | 900 |
| 2-hexyl-1-decyl laurate | 11.5 | 3.1 | −54 | 240 | 1380 |
| 2-hexyl-1-decyl caprate/caprylate | 8.5 | 2.5 | −58 | 226 | 1320 |
| 2-hexyl-1-decyl heptanoate | 6.6 | 2.1 | −56 | 202 | |

The esters used according to the invention have a kinematic viscosity lower than 30 $mm^2/s$ at 40° C. and lower than 5 $mm^2/s$ at 100° C., a pour point lower than −40° C. and a flash point greater than 200° C. They also present a good oxidation stability, since they have a value at the RPVOT test greater than 700 min. It can also be concluded that those specific esters are compatible with usual antioxidants used in the field of lubricants with mineral base oils.

1.4. Thermal Properties

The thermal conductivity was measured according to the standard ASTM 7896.

Results are gathered in Table 2 below.

TABLE 2

Thermal properties

| | Thermal conductivity at 20° C. (W/m · ° C.) |
|---|---|
| isoamyl isostearate | 0.137 |
| 2-pentyl-1-nonyl isostearate | 0.152 |
| 2-hexyl-1-decyl isostearate | 0.148 |
| 2-hexyl-1-decyl laurate | 0.153 |
| 2-hexyl-1-decyl caprate/caprylate | 0.148 |

The esters used according to the invention present a good thermal conductivity. Since the thermal conductivity is the ability to conduct heat, those esters can be used as coolants.

1.5. Electrical Properties

The dielectric breakdown was measured according to the standard ASTM D877.

Results are gathered in Table 3 below.

TABLE 3

Electrical properties

| | Dielectric breakdown at 20° C. (kV) |
|---|---|
| isoamyl isostearate | 40.8 |
| 2-hexyl-1-decyl isostearate | 38 |
| 2-hexyl-1-decyl laurate | 32 |
| 2-hexyl-1-decyl heptanoate | 56.3 |
| 2-hexyl-1-decyl caprate/caprylate | 55.4 |

The dielectric breakdown are higher than 30 kV, meaning the esters used according to the invention can each be used as a dielectric fluid.

1.6. Elastomers Compatibility Properties

The compatibility of esters with elastomers was measured according to the standard ISO 6072 by immersing each elastomer in an ester for 168 hours at 100° C.

Results are gathered in Table 4 below.

TABLE 4

Elastomers NBR1, HNBR and FMK2 compatibility properties

| | NBR1 Volume change (%) | HNBR1 Volume change (%) | FMK2 Volume change (%) |
|---|---|---|---|
| isoamyl isostearate | 14.4 | 14 | 1.3 |
| 2-pentyl-1-nonyl isostearate | 7.27 | 6.34 | 0.54 |
| 2-hexyl-1-decyl isostearate | 5.52 | 4.99 | 2.04 |
| 2-hexyl-1-decyl laurate | 7.32 | | 0.35 |
| 2-hexyl-1-decyl caprate/caprylate | 9.92 | | 0.54 |
| 2-hexyl-1-decyl heptanoate | 13.4 | | 1.20 |

The esters used according to the invention present a good compatibility with elastomers. In particular, it was observed less than 15% change in volume with elastomer NBR 1, and less than 2.5% change in volume with elastomer FKM 2, when they were immersed in esters used according to the invention, change in volume being measured according to the standard ISO 6072 after 168 hours at 100° C.

The compatibility of esters with following elastomers:
  ethylene acrylic (AEM): Vamac 7900 from Jeantet Elastomères;
  polyacrylate (ACM): HyTemp ACM AR12 from Zeon Chemicals;
  was also measured by immersing each elastomer in an ester for 240 hours at 80° C.

The volume variations, expressed as percentages, are gathered in Table 5 below.

TABLE 5

Elastomers AEM and ACM compatibility properties

| | AEM Volume change (%) | ACM Volume change (%) |
|---|---|---|
| 2-hexyl-1-decyl isostearate | 1 | 2 |

It can be seen that 2-hexyl-1-decyl isostearate has a slight effect on the volume of the elastomers AEM and ACM. It can then be concluded that 2-hexyl-1-decyl isostearate presents a good compatibility with AEM and ACM.

1.7. Plastics Compatibility Properties

The compatibility of esters with plastics was measured by immersing each plastic in an ester for 242 hours at 80° C., and comparing the mass of each plastic before and after the immersion.

Plastics Tested:
  polyamide: Ertalon 6 SA PA6 (PA6) from Mitsubishi Chemical Group;
  epoxy: Vetronit EGS 619 from Von Roll;
  polyimide (PI): Kapton HN from DuPont;
  polyoxymethylene (POM): Tecaform AH black from Ensinger;
  polyethylene terephthalate (PET): Mylar A from Dr. Dietrich;
  Polyurethane resin (PU): Scotchcast 40 from 3M.

The mass variations, expressed as percentages, are gathered in Table 6 below.

TABLE 6

Plastics compatibility properties

| | PA6 Mass change (%) | Epoxy Mass change (%) | PI Mass change (%) | POM Mass change (%) | PET Mass change (%) | PU Mass change (%) |
|---|---|---|---|---|---|---|
| 2-hexyl-1-decyl isostearate | −0.9 | 0 | 0 | 0 | 0 | 1.5 |

It can be observed that 2-hexyl-1-decyl isostearate has poor or even no effect on the mass of the plastics. It can then be concluded that 2-hexyl-1-decyl isostearate presents a good compatibility with different plastics, especially those that may be used in an electric vehicle and that may be in direct contact with them.

The invention claimed is:

1. A functional fluid suitable for use in an electric vehicle comprising an ester selected from the group consisting of:
  esters obtainable from esterification of a saturated branched monoalcohol comprising from 5 to 16 carbon atoms, with isostearic acid;
  esters obtainable from esterification of 2-hexyl-1-decanol with a saturated fatty acid comprising from 7 to 18 carbon atoms; and
  mixtures thereof,
wherein, when an acrylonitrile-butadiene rubber with an acrylic nitrile content of 28% by weight based on total weight of the rubber (NBR 1) is immersed in the functional fluid, the NBR 1 has no more than a 15% change in volume, the change in volume being measured according to standard ISO 6072 after 168 hours at 100° C.

2. The functional fluid according to claim 1, wherein, when a fluorinated rubber comprising vinylidene fluoride, hexafluoropropylene and tetrafluoroethylene and having a fluorine content comprised between 68 and 69% by weight based on total weight of the rubber (FKM 2) is immersed in the functional fluid, the FKM 2 has no more than 2.5% change in volume, the change in volume being measured according to standard ISO 6072 after 168 hours at 100° C.

3. The functional fluid according to claim 1, wherein the saturated branched monoalcohol is selected from the group consisting of isoamyl alcohol, 2-ethylbutyl, 2-butylhexanol, 2-butyl-1-heptanol, 2-butyl-1-octanol, 2-pentyl-1-nonanol, 2-hexyl-1-octanol and 2-hexyl-1-decanol.

4. The functional fluid according to claim 1, wherein the saturated fatty acid is selected from the group consisting of heptanoic acid, caprylic acid, capric acid, lauric acid, myristic acid, palmitic acid, isostearic acid, and mixtures thereof.

5. The functional fluid according to claim 1, wherein the ester is selected from the group consisting of:
  isoamyl isostearate;
  2-pentyl-1-nonyl isostearate;
  2-hexyl-1-decyl isostearate;
  2-hexyl-1-decyl laurate;
  2-hexyl-1-decyl caprylate/caprate; and
  2-hexyl-1-decyl heptanoate.

6. The functional fluid according to claim 1, wherein the ester is selected from the group consisting of:
  2-pentyl-1-nonyl isostearate;
  2-hexyl-1-decyl isostearate;
  2-hexyl-1-decyl laurate; and
  2-hexyl-1-decyl caprylate/caprate.

7. The functional fluid according to claim 1, wherein the ester is 2-hexyl-1-decyl isostearate.

8. A method for lubricating and cooling one or more device(s) in an electric vehicle, comprising bringing into contact the device(s) with an ester selected from the group consisting of:
- esters obtainable from esterification of a saturated branched monoalcohol comprising from 5 to 16 carbon atoms, with isostearic acid;
- esters obtainable from esterification of 2-hexyl-1-decanol with a fatty acid comprising from 7 to 18 carbon atoms; and
- mixtures thereof.

9. The method according to claim 8, wherein the ester is brought into contact via a functional fluid comprising:
- an ester selected from the group consisting of:
  - isoamyl isostearate;
  - 2-pentyl-1-nonyl isostearate;
  - 2-hexyl-1-decyl isostearate;
  - 2-hexyl-1-decyl laurate;
  - 2-hexyl-1-decyl caprylate/caprate;
  - 2-hexyl-1-decyl heptanoate; and
- an antioxidant additive;

wherein the functional fluid does not contain any diester.

* * * * *